United States Patent
Stoffels et al.

(10) Patent No.: US 10,006,344 B2
(45) Date of Patent: Jun. 26, 2018

(54) TWIN TURBO ENGINE

(71) Applicant: Ford Global Technologies, LLC, Dearborn, MI (US)

(72) Inventors: Harald Stoffels, Cologne (DE); Ludwig Stump, Cologne (DE); Carsten Weber, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 14/919,396

(22) Filed: Oct. 21, 2015

(65) Prior Publication Data

US 2016/0108799 A1 Apr. 21, 2016

(30) Foreign Application Priority Data

Oct. 21, 2014 (DE) .................. 10 2014 221 333

(51) Int. Cl.
| | |
|---|---|
| *F02B 37/10* | (2006.01) |
| *F02B 37/00* | (2006.01) |
| *F01N 5/04* | (2006.01) |
| *F02B 37/007* | (2006.01) |
| *F02B 37/18* | (2006.01) |
| *F02M 26/08* | (2016.01) |

(52) U.S. Cl.
CPC ............ *F02B 37/10* (2013.01); *F01N 5/04* (2013.01); *F02B 37/002* (2013.01); *F02B 37/004* (2013.01); *F02B 37/007* (2013.01); *F02B 37/18* (2013.01); *F02M 26/08* (2016.02); *Y02T 10/144* (2013.01); *Y02T 10/16* (2013.01)

(58) Field of Classification Search
CPC .......... F01N 5/04; F02B 37/44; F02B 37/002; F02B 37/004; F02B 37/007; F02B 37/10; F02B 37/18; F02M 26/08
USPC .................................. 123/559.1; 60/608, 612
See application file for complete search history.

(56) References Cited

U.S. PATENT DOCUMENTS

| | | | | |
|---|---|---|---|---|
| 4,756,377 A | * | 7/1988 | Kawamura | B60K 6/22 180/165 |
| 4,955,199 A | * | 9/1990 | Kawamura | F02B 37/013 60/608 |
| 4,958,497 A | * | 9/1990 | Kawamura | F02B 37/013 60/608 |
| 5,678,407 A | * | 10/1997 | Hara | F02B 37/005 60/608 |
| 6,062,026 A | * | 5/2000 | Woollenweber | F02B 37/04 60/605.2 |
| 6,920,755 B2 | | 7/2005 | Hoecker et al. | |
| 7,509,805 B2 | | 3/2009 | Karlsson | |

(Continued)

FOREIGN PATENT DOCUMENTS

| | | |
|---|---|---|
| DE | 102009013040 A1 | 9/2010 |
| DE | 102010032249 A1 | 2/2011 |

(Continued)

*Primary Examiner* — Jason Newton
(74) *Attorney, Agent, or Firm* — Julia Voutyras; McCoy Russell LLP

(57) ABSTRACT

There is provided an arrangement of an internal combustion engine with a sequentially parallel twin turbocharger, in which at least one turbocharger has an electrical energy converter which can be used optionally as a motor for driving a compressor in the lower rotational speed range of the internal combustion engine or as a generator for charging a connected battery.

18 Claims, 5 Drawing Sheets

(56) References Cited

U.S. PATENT DOCUMENTS

| | | | |
|---|---|---|---|
| 7,640,745 B2* | 1/2010 | Japikse | F01D 13/003 60/605.1 |
| 8,109,092 B2 | 2/2012 | Pursifull et al. | |
| 8,225,608 B2 | 7/2012 | Wu et al. | |
| 8,495,875 B2 | 7/2013 | Triller et al. | |
| 2003/0145597 A1* | 8/2003 | Kusase | B60K 6/24 60/698 |
| 2009/0320468 A1* | 12/2009 | Shimizu | F02B 37/10 60/608 |
| 2010/0051363 A1* | 3/2010 | Inoue | B60K 6/485 180/65.26 |
| 2010/0089056 A1 | 4/2010 | Cooper et al. | |
| 2014/0346865 A1* | 11/2014 | Akashi | B60L 11/1851 307/10.7 |

FOREIGN PATENT DOCUMENTS

| | | | | |
|---|---|---|---|---|
| DE | 102012206381 A1 | 10/2013 | | |
| JP | 04054218 A | * | 2/1992 | F01N 5/04 |
| JP | H0454218 A | | 2/1992 | |
| JP | 2008255902 A | | 10/2008 | |

* cited by examiner

TWIN TURBO ENGINE

CROSS REFERENCE TO RELATED APPLICATION

The present application claims priority to German Patent Application No. 102014221333.9, filed Oct. 21, 2014, the entire contents of which are hereby incorporated by reference for all purposes.

FIELD

The present description relates generally to methods and systems controlling at least a first electrical energy converter of a vehicle.

BACKGROUND/SUMMARY

Turbochargers may supply one or more cylinders of an internal combustion engine with combustion air which is compressed. A turbocharger comprises a turbine and a compressor which can have a similar construction and are mounted on a joint shaft. A mass flow of an exhaust gas may rotate a turbine wheel in the turbine in order to turn the compressor. Torque is transmitted via the joint shaft to the compressor wheel in the intake tract, as a result of which the compressor compresses combustion air.

As long as sufficient exhaust gas flows into the turbine, the rotational speed may be sufficient to turn the compressor to a desired compressor speed. However, providing sufficient exhaust gas to the turbine at lower loads presents certain challenges. The turbo may react in a delayed manner (e.g., turbo lag) in response to a sudden acceleration at low engine loads.

Two turbochargers can be used in the upper rotational speed range, while in the lower rotational speed ranges in the case of only one used turbine, said turbine can build up a charging pressure more rapidly.

Problems in using sequential twin turbochargers may include control of torque fluctuations during activation or deactivation of the second turbocharger and corresponding power fluctuations, as well as a costly exhaust gas flap valve control mechanism in order to activate or deactivate the second turbocharger. Moreover, even when using sequential twin turbochargers, a part of the exhaust gas energy is still unused from the continuously driven turbocharger, and control of a low-pressure and/or high-pressure exhaust gas return is difficult. The inventors herein have recognized that a sequential twin turbocharger which enables effective turbocharging of an internal combustion engine while avoiding the cited disadvantages is possible. To resolve the above described problem at low loads, two turbochargers may be used in parallel. More specifically, the two turbochargers may be sequential, wherein a first turbocharger is continuously driven during engine operation and a second turbocharger is only driven during engine conditions leading to insufficient exhaust flow to the turbine of the first turbocharger.

In one example, the issues described above may be addressed by a system for a turbocharged engine with a first turbocharger comprising at least a first turbine and a first compressor, and a second turbocharger comprising at least a second turbine and a second compressor, where the first and second turbochargers are arranged in parallel, an exhaust line comprising a valve device located between the engine and the second turbine, and a first electrical energy converter located on a second shaft between the second turbine and the second compressor. In this way, the second compressor may be able to assist the first compressor during periods of insufficient exhaust flow.

As one example, the first turbine may further include a wastegate with a bypass passage leading to the second turbine and as a result, normally unused exhaust gas may be used to drive the second turbine. Additionally, the first turbocharger may include a second electrical energy converter located on the first shaft between the first turbine and the first compressor. The first and second electrical energy converters may be operated based on one or more of an exhaust flow and a battery state of charge.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
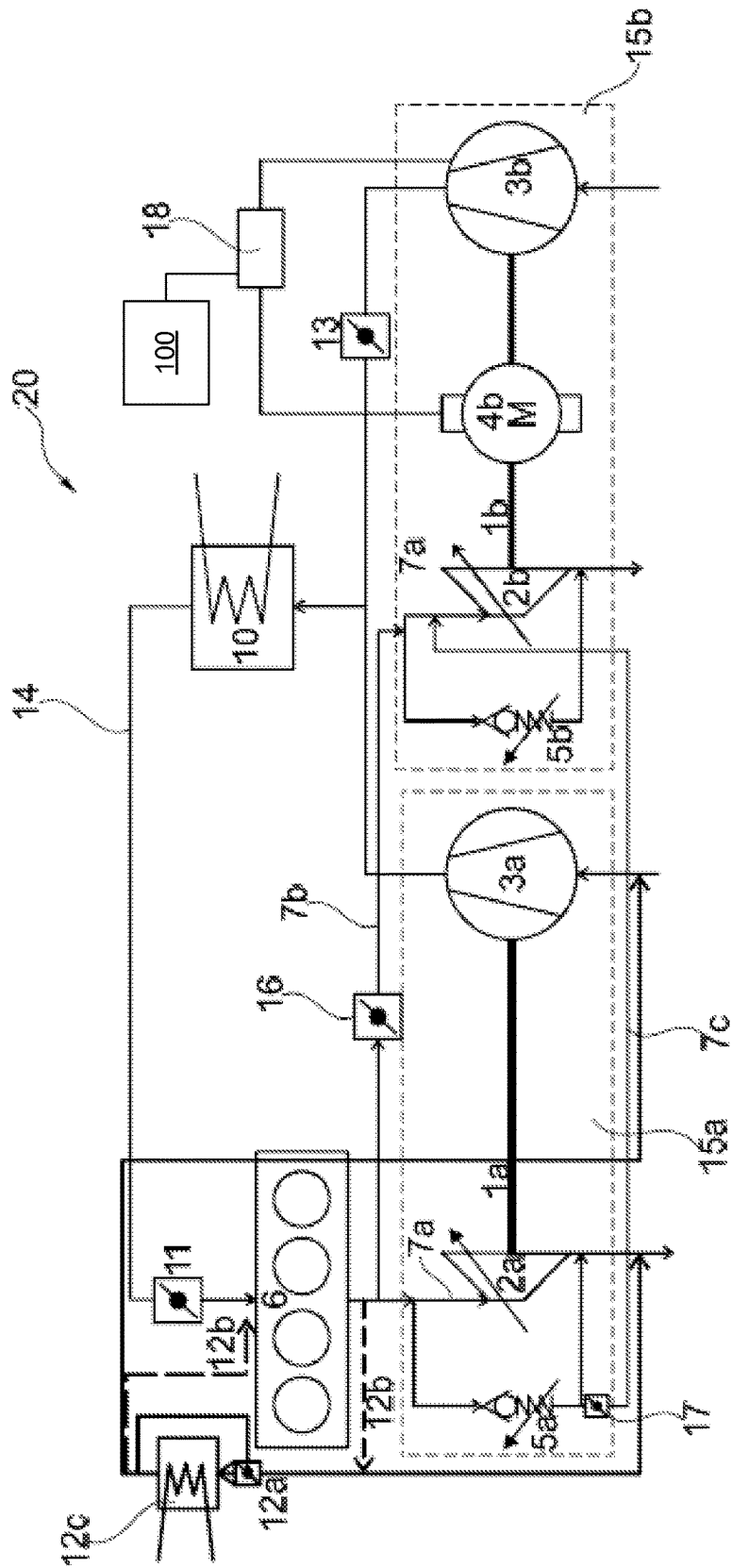
FIG. 1 shows an exemplary embodiment of an arrangement according to the invention with a first electrical energy converter.
Figure 2:
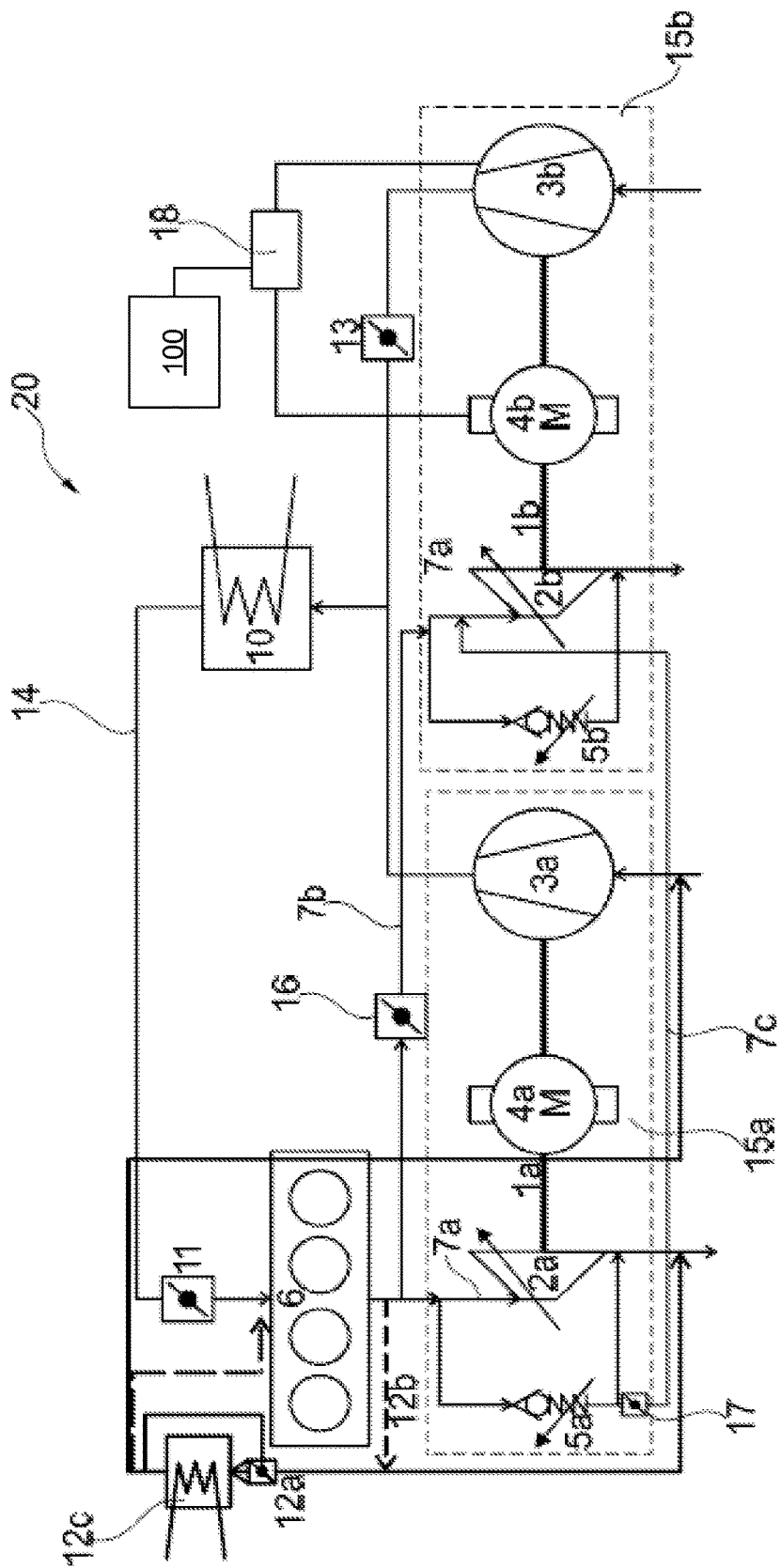
FIG. 2 shows the arrangement according to FIG. 1 with an additional second electrical energy converter.
Figure 3:
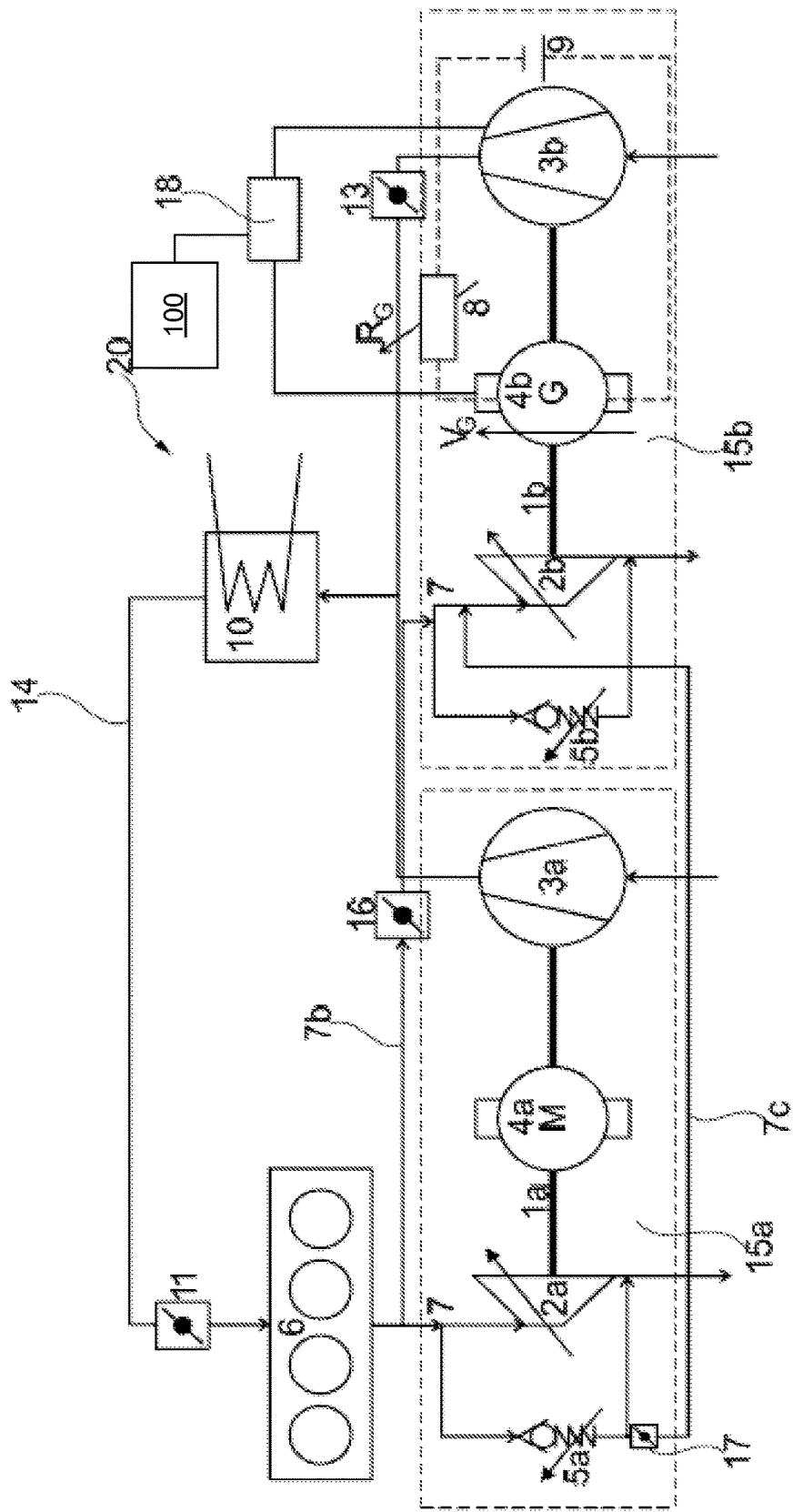
FIG. 3 shows the arrangement according to FIG. 1 with an additional second electrical energy converter.
Figure 4:
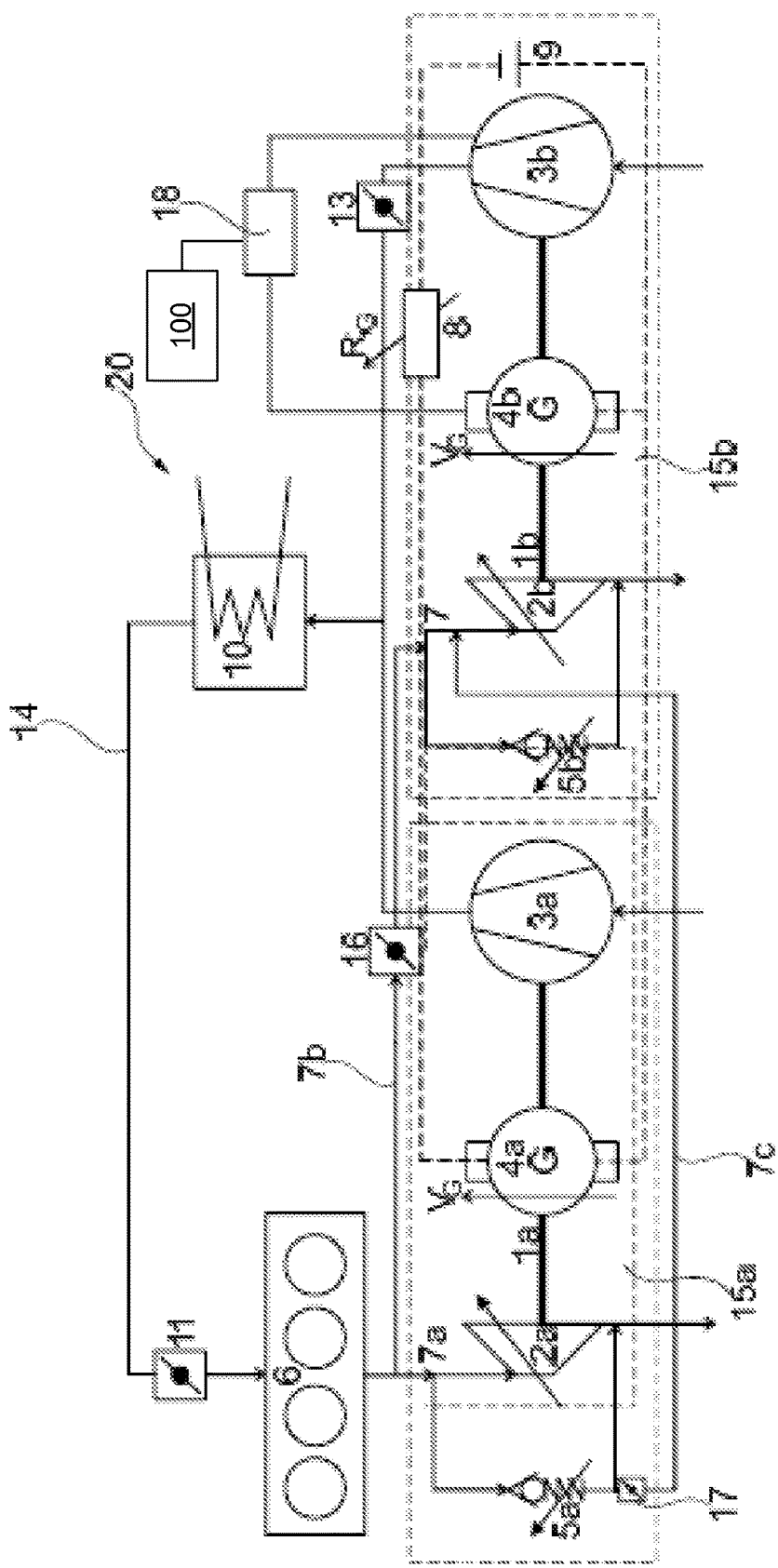
FIG. 4 shows the arrangement according to FIG. 1 with an additional second electrical energy converter.
Figure 5:
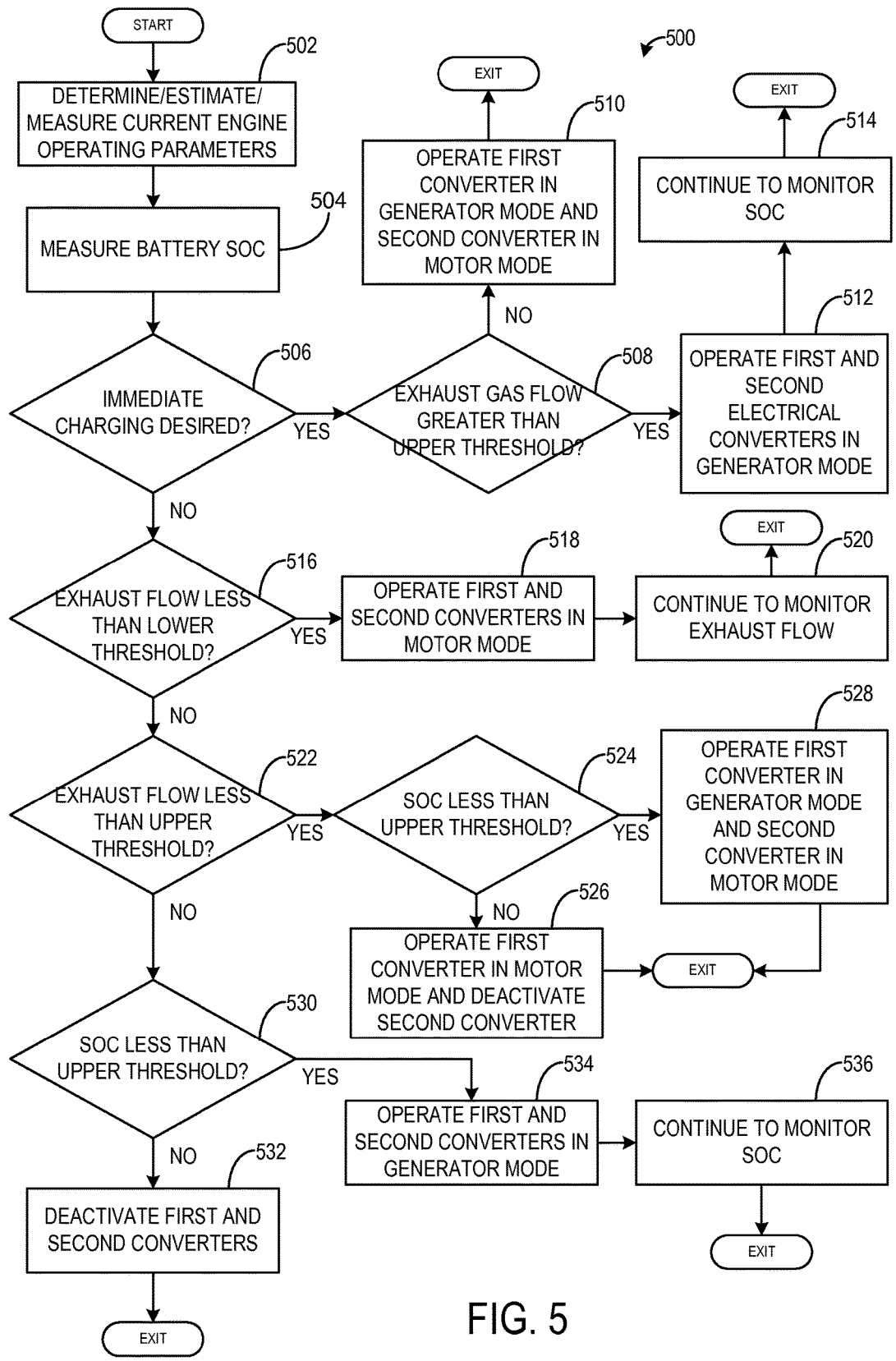
FIG. 5 shows a method for operating first and second electrical energy converters in either a motor or a generator mode based on conditions.

The disclosure relates to an arrangement of an internal combustion engine with a first and a second turbocharger, of which at least the second turbocharger additionally has an electrical energy converter as shown in FIG. 1. The first turbocharger may also comprise a separate electrical energy converter, wherein the separate electrical energy converters may be operated in motor or generator modes, as shown in FIGS. 2-4. A method for operating the electrical energy converters based on an exhaust gas flow and/or state of charge of a battery is shown in FIG. 5.

In a first embodiment, an internal combustion engine for a motor vehicle may comprise a first turbocharger comprising at least a first turbine and at least a first compressor and a second turbocharger, which has at least a second turbine and at least a second compressor. The first and the second turbochargers may be arranged in parallel, and at least one valve device may be located in an exhaust gas transverse line from the exhaust gas tract to the second turbine to control a flow of exhaust gas to the second turbine. A first electrical energy converter may be coupled to a shaft of the second turbocharger between the second turbine and the second compressor.

The first electrical energy converter in the second turbocharger may bridge torque fluctuations which may occur during operation of the first turbocharger in response to activating the second turbocharger which electrically drives the second compressor until a sufficient exhaust gas pressure is able to drive the second turbine. Moreover, the second compressor can also be driven by the first electrical energy converter without the second turbocharger being activated to build up the charging pressure in order to avoid sealing problems which can arise during operation of the first turbocharger and complete idleness of the second.

Moreover, the first electrical energy converter can also be operated as a generator by exhaust gas conducted out of the wastegate of the first turbine into the second turbine which then drives the generator. In this manner, normally unused exhaust gas can be used for energy generation. The generation of charging pressure in the case of exhaust gas return into the second compressor by control of the rotor speed of the second compressor can also be controlled by the first electrical energy converter.

In another embodiment at least a second electrical energy converter is located on a first shaft between the first turbine and the first compressor such that the second turbocharger comprises the first electrical energy converter and the first turbocharger comprises the second electrical energy converter. The compressors of both turbochargers can thus be electrically driven as long as insufficient exhaust gas is available for driving the turbines in the lower rotational speed ranges. Moreover, an electrical energy converter can thus be operated in the generator mode, while the other is operated in the motor mode. The rotor speed of both compressors can thus also be advantageously controlled.

A battery is electrically connected to one or more of the first and the second electrical energy converters. The battery serves to provide electrical energy for the first and second electrical energy converters for operation in the motor mode. The battery can be recharged if the electrical energy converters are operated in the generator mode. Thus, the electrical energy converters can optionally be operated as an electric motor or generator.

Exhaust gas can be introduced into the first and/or second compressor via an exhaust gas recirculation system (EGR). The EGR serves to reduce the emissions of nitrogen oxides in the exhaust gas and to reduce charge cycle losses. This may involve a low-pressure EGR. Alternatively, exhaust gas can also be introduced via a high-pressure EGR into the intake tract, the introduction being carried out downstream of the one or more compressors such that high-pressure exhaust gas does not flow through the first and/or second compressors.

As described above, the turbochargers are arranged in parallel. Both turbochargers can be operated as traditional twin turbochargers when the internal combustion engine runs with a high rotational speed and compression is demanded by both turbochargers. The exhaust gas energy of the internal combustion engine is divided between the two turbochargers. The exhaust gas energy provided to the two turbochargers may be substantially equal or unequal.

Moreover, a wastegate line from the wastegate of the first turbine to the second turbine is located in the exhaust system. The waste gate line may provide normally unused exhaust gas energy to the second turbine in order to drive the first electrical energy converter in the generator mode. The generator mode may increase a current state of charge (SOC) of a battery electrically coupled to the first electrical energy converter.

A motor vehicle comprises an internal combustion engine with a first turbocharger, which comprises at least a first turbine and at least a first compressor and a second turbocharger, which has at least a second turbine and at least a second compressor. The first and the second turbochargers being arranged in parallel, and at least one valve device being arranged and formed in an exhaust gas transverse line from the exhaust gas tract to the second turbine to at least partially open or close the exhaust gas transverse line, wherein at least a first electrical energy converter is arranged on a second shaft between the second turbine and the second compressor.

The electrical energy converter(s) may be used optionally as electric motors for driving the compressors or as generators for charging the battery.

Ongoing operation of the first turbocharger may include conducting exhaust gas into the first turbine and compressing intake air by the first compressor. The second turbocharger may be activated by opening the valve device in an exhaust gas transverse line for conducting exhaust gas into the second turbine for additional compression of intake air by the second compressor. The second compressor may be operated by the first electrical energy converter in a motor mode until is sufficient to operate the second compressor at a substantially equal speed. A fluctuation in torque may be avoided by a slow run-up of the second compressor. Moreover, if an electrical energy converter is arranged in both turbochargers, the first and the second compressor can be operated by the second or first energy converters in the motor mode, respectively.

In an example, operation of the first turbocharger may include conducting exhaust gas into the first turbine and compressing intake air by the first compressor in phases in which the second turbocharger is not used for compression and the valve device in the exhaust gas transverse line is closed (e.g., exhaust gas does not flow directly from the engine to the second turbine). Exhaust gas is conducted from the wastegate of the first turbine through the wastegate line to the second turbine in order to operate the first electrical energy converter in generator mode. As a result, otherwise unused exhaust gas energy may be used for charging a battery connected to the first energy converter of the second turbocharger and possibly also to the second electrical energy converter of the first turbocharger.

Additionally or alternatively, the valve device in the exhaust gas line may be opened in order to flow exhaust gas into the second turbine in order to activate the second compressor. Thus, both the first compressor and the second compressor may compress a charge air flow. Charge air may refer to an intake gas flowing to the first and/or second compressors. The charge air may be a mixture of intake air and low-pressure EGR. In response to sufficient exhaust flow to both the first and the second turbines, the first electrical energy converter may be operated in the generator mode in order to regenerate (e.g., increase the SOC) of the battery. Additionally or alternatively, the second electrical energy converter may also be operated in the generator mode. In other words, the battery may be recharged while the first and second turbochargers are powered by the exhaust gas flow. The battery may be recharged if a SOC is below a lower threshold or if sufficient exhaust flow is provided to the first and second turbochargers in order to meet a driver demand.

Turning now to FIG. 1, a system 20 of an internal combustion engine 6 with sequentially parallel twin turbochargers 15a, 15b is represented in the representation of FIG. 1. First turbocharger 15a and second turbocharger 15b may each comprise a shaft 1a or 1b which connects a turbine 2a or 2b to a compressor 3a or 3b, respectively. The exhaust gas of internal combustion engine 6 is conducted through exhaust gas tract 7a and may drive turbine 2a. The exhaust gas may also drive the second turbine 2b when a valve device 16 is at least partially open, allowing exhaust gas to flow through an exhaust gas transverse line 7b to the second turbine 2b without flowing to the first turbine 2a.

Second turbocharger 15b has a first electrical energy converter 4b which is arranged on second shaft 1b between second turbine 2b and second compressor 3b. As depicted, the energy converter 4b is operated in motor mode M. Alternatively, energy converter 4b can also be operated in generator mode G, as will be shown in FIGS. 3 and 4. There is furthermore present in system 20 a control device 18 which may monitor and adjust the control parameters of turbochargers 15a, 15b, particularly of electrical energy converters 4a, 4b and of compressors 3a, 3b. The control device 18 may be electrically coupled to a controller 100.

First turbine 2a and second turbine 2b comprise respective first and second wastegate 5a or 5b. First wastegate 5a of first turbocharger 2a can be in fluid communication to the second turbine 2b via a wastegate exhaust gas line 7c. A wastegate valve 17 may be present in wastegate exhaust gas line 7c for control of the exhaust gas flow from waste gate 5a. The second wastegate 5b may direct bypassed exhaust gas to an ambient environment.

Charge air cooler 10 in intake tract 14 may cool the compressed charge air and/or the intake charge air in order to compress via cooling. Throttle 11 arranged in intake tract 14 directly in front of internal combustion engine 6 may regulate the air quantity entering one or more cylinders for power control of internal combustion engine 6.

In the exemplary embodiment according to FIG. 1, for an exhaust gas recirculation (EGR) system 12a, exhaust gas is removed after first turbine 2a, conducted through a cooler 12c, and conducted into first compressor 3a in order to provide low-pressure EGR to the engine 6. The EGR can also be conducted into second compressor 3b or into both compressors 3a, 3b. The EGR can also be removed after second turbine 2b. For cooling, the EGR may also be conducted through charge air cooler 10. A high-pressure EGR 12b (shown via a dashed line) can optionally also be used, the exhaust being drawn upstream of the first turbine 2a, conducted through cooler 12c, and introduced again downstream of charge air cooler 10 and throttle 11.

The valve device 16 is located in the exhaust gas transverse line 7b for allowing passage of exhaust gas from internal combustion engine 6 to second turbine 2b. By opening valve device 16, exhaust gas can be conducted to second turbine 2b. By closing valve device 16, second turbocharger 15b may no longer receive exhaust gas directly from the engine 6. A further control valve 13 serves to control the quantity of charge air from second compressor 3b to intake tract 7b. Thus, the control valve 13 is actuated based on a difference between a desired charge air flow and a compressed charge air flow provided by the compressor 3a. For example, as the difference increases, then the control valve 13 may be moved to a more open position to allow more charge air from the compressor 3b in order to meet the desired charge air flow.

Thus, as shown in the embodiment of FIG. 1, turbochargers 15a and 15b are being simultaneously driven. Turbine 2a receives exhaust gas from the engine 6 in order to continuously drive the compressor 3a in order to provide compressed air to the engine 6. However, compressor 3a may be unable to provide a sufficient amount of compressed air due to an insufficient amount of exhaust flow to the turbine 2a. As a result, compressor 3b is activated via one or more of the first electrical energy converter 4b operating in the motor mode M and by opening the valve device 16 in order to allow a portion of exhaust gas to flow to the second turbine 2b. If the valve device 16 is open and the first energy converter 4b is operating in the motor mode, then both components may work in conjunction such that the compressor 3b spins sufficiently to be able to supplement a compressed air flow provided by the compressor 3a in order to meet the charge air demand.

Turning now to FIG. 2, shows the system 20 substantially similar to the embodiment of FIG. 1 further including a second electrical energy converter 4b located on the first shaft 1a between the first turbine 2a and the first compressor 3a. Both the first and the second electrical energy converters 4b and 4a, respectively, are shown operating in the motor mode. In this way, both the first compressor 3a and the second compressor 3b are at least partially electrically driven until exhaust flow is sufficient to drive both the first turbine 2a and the second turbine 2b. Additionally or alternatively, either the first electrical energy converter 4b or the second electrical energy converter 4a may be deactivated or switched to a generator mode if the exhaust flow is sufficient to drive either the first turbine 2a or the second turbine 2b, respectively.

Turning now to FIG. 3, shows the system 20 substantially similar to FIGS. 1 and 2, however, EGR system 12a has been omitted for reasons of brevity and a battery 9 and a variable generator load 8 are shown electrically coupled to the first electrical energy converter 4b. The battery 9 may drive the first electrical energy converter 4b in the motor mode, while the first electrical energy converter may recharge the battery 9 in a generator mode. If an exhaust flow is sufficient to drive the first turbine 2a at a speed high enough to power the first compressor 2a to provide the demanded charge air, then the first electrical energy converter may be operated in the generator mode G in order to recharge (e.g., increase a state of charge) of the battery 9, as shown. The valve device 16 is closed and exhaust gas does not flow from the engine 6 to the turbine 2b via the exhaust gas transverse line 7b. The wastegate valve 17 is opened in order to bypass a portion of exhaust gas around the turbine 2a and into the second turbine 2b in order to operate the first electrical energy converter in the generator mode. In this way, normally unused exhaust gas energy is utilized, as described above. $V_G$ is the voltage generated by the first electrical energy converter 4b provided to the battery 9. $R_G$ is the resistance of the variable generator load 8.

Additionally or alternatively, if the SOC of the battery 9 is greater than a charge threshold (e.g., the battery is fully charged), which may be measured by the variable generator load 8, then the first electrical energy converter 4b may be deactivated (e.g., not in the motor or the generator mode) while the second electrical energy converter 4a continues to operate in the motor mode in assist driving the compressor 3a.

Turning now to FIG. 4, system 20 of internal combustion engine 6 with twin turbochargers 15a, 15b has, in comparison with system 20 from FIG. 3, an extended current circuit which electrically coupled the second energy converter 4a to the battery 9 and variable generator load 8. Second electrical energy converter 4a and the first electrical energy converter 4b are operated in generator mode G. Battery 9 can thus be charged by both electrical energy converters 4a, 4b. Both electrical energy converters 4a and 4b may operate in the generator mode in response to a SOC of the battery 9 being less than a lower charge threshold (e.g., battery is depleted). Battery 9 may further be recharged by both the electrical energy converters in response to an exhaust flow sufficiently driving one or more of the first turbine 2a and the second turbine 2b.

If both the second and the first electrical energy converter 4a, 4b should be operated in generator mode G, exhaust gas is conducted through exhaust gas tracts 7 and 7b (with open valve device 16) to turbines 2a or 2b. In this manner, battery 9 connected to electrical energy converters 4a, 4b is charged if, for example, no charging of the intake tract by turbochargers 15a, 15b is required, or if a rapid charging of the battery is necessary.

Turning now to FIG. 5, a method 500 for operating the first and second electrical converters in conjunction with the first and second turbochargers is depicted. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may adjust a signal to an actuator coupled to a valve, such as one of the valves described herein, to adjust position of the valve during engine operation.

The method 500 may be described with reference to components depicted in the embodiments of the figures described above. Specifically, the method 500 may be described in reference to first turbocharger 15a, second turbocharger 15b, first turbine 2a, second turbine 2b, first compressor 3a, second compressor 3b, first electrical converter 4a, second electrical energy converter 4b, and battery 9.

The method 500 may begin at 502 where the method 500 includes determining, estimating, and/or measuring current engine operating parameters. The current engine operating parameters may include one or more of an engine speed, engine load, intake manifold vacuum, vehicle speed, exhaust gas mass flow rate, and air/fuel ratio.

At 504, the method 500 includes measuring a state of charge (SOC) of a battery. As described above, the battery is electrically connected to at least the first electrical energy converter, where the first converter is able to electrically assist the second compressor. Electric assistance may be provided to the second compressor in response to an exhaust flow incapable of turning a second turbine corresponding to the second compressor to a desired turbine speed. Additionally or alternatively, the first turbocharger may comprise a second electrical energy converter also electrically coupled to the battery, as described above with respect to FIG. 4. The state of charge may be measured via a variable generator load (e.g., variable generator load 8). At 506, the method 500 determines if immediate charging of the battery is desired based on the measured SOC. For example, if the SOC is zero or near zero, then the battery may desire to be charged. Additionally or alternatively, the battery may desire to be charged if the SOC is less than a lower threshold, where the lower threshold is based on a SOC insufficient to electrically assist a compressor.

If a recharge of the battery is desired, then the method 500 proceeds to 508 to determine if an exhaust gas flow is greater than an upper threshold flow. The upper threshold may be based on an exhaust flow capable of driving both turbines of the vehicle without providing electrical assistance to the compressors. In this way, the exhaust flow is sufficient to provide the engine with the desired volume of compressed charge air.

If the exhaust gas flow is not greater than the upper threshold flow, then the method 500 may proceed to 510 to operate the first converter in a generator mode and the second converter in a motor mode. Exhaust flow less than the upper threshold flow may be able to drive one of the turbines or none of the turbines. As a result, at least one of the converters may be operated in the motor mode. The first converter in the generator mode may recharge the battery while the second converter may electrically assist the first compressor of the first turbocharger to provide sufficient compressed charge air to the engine. A wastegate of the first turbocharger may be at least partially open in order to divert a portion of exhaust flow from the first turbine to the second turbine. The first converter may transform the kinetic energy created by spinning the second turbine with the bypassed exhaust gas to electric energy to be provided to the battery.

Returning to 508, if the method 500 determines that the exhaust gas flow is greater than the upper threshold flow, then the method 500 may proceed to 512 to operate the first electrical converter and the second electrical converter in the generator mode. When the exhaust flow is greater than the upper threshold flow, both turbines may receive sufficient exhaust flow in order to drive their corresponding compressors to provide the demanded compressed charge air to the engine. Thus, both converters may be operated in the generator mode in order to more rapidly recharge the battery. The wastegate of the first turbocharger may be at least partially open in order to drive the second converter in the generator mode.

At 514, the method 500 may continue to monitor the SOC of the battery. If the SOC of the battery increases beyond the lower threshold, then one or more of the converters may switch to the motor mode or be deactivated, as will be described below.

Returning to 506, if the method 500 determines that the immediate recharge is not desired, then the method 500 continues to 516 to determine if the exhaust flow is less than a lower threshold flow. The lower threshold flow may be based on an exhaust flow unable to drive either the first and/or second turbines in order to sufficiently power the first and/or second compressors to provide the engine with the desired compressed charge air.

If the exhaust flow is less than the lower threshold flow, then the method 500 proceeds to 518 to operate the first and second electrical converters in motor mode in order to electrically assist the second and first compressors, respectively. The battery may power the first and second electrical converters.

At 520, the method 500 may continue to monitor exhaust gas flow in order to determine if the exhaust flow is sufficient to drive the first turbine to power the first compressor and as a result, deactivate the second converter or switch the second converter to the generator mode.

Returning to 516, if the exhaust flow is greater than the lower threshold and therefore at least able to drive one of the turbines of the vehicle, then the method 500 proceeds to 522 to determine if the exhaust flow is less than the upper threshold, where the upper threshold is greater than the first threshold. If the exhaust flow is between the upper threshold and the first threshold, then the exhaust flow is capable of driving at least one of the turbines of the vehicle to power a corresponding compressor to meet the compressed charge air demand.

If the exhaust flow is less than the second threshold flow, then the method proceeds to 524 to determine if the SOC of the battery is less than an upper threshold SOC. The upper threshold SOC may be based on a full SOC of the battery. In this way, a SOC of the battery being greater than the upper threshold SOC may indicate the battery being fully charged. Charging a battery beyond the upper threshold may be undesired.

If the SOC of the battery is less than the upper threshold, then the method 500 proceeds to 526 to operate the first converter in motor mode and to deactivate the second converter. In this way, the second compressor may be electrically assisted while the first compressor is completely driven by the first turbine. Furthermore, the second electrically energy converter neither drives the first compressor nor does it recharge the battery due to the SOC being greater than the upper threshold SOC.

If the SOC is less than the threshold SOC, then the method 500 proceeds to 528 to operate the first converter in generator mode and the first converter in motor mode. The wastegate of the first turbine is at least partially open in order to operate the first converter in the generator mode. The second converter is operated in the motor mode in order to assist the first turbine in powering the first compressor.

Returning to 522, if the method 500 determines that the exhaust flow is not less than the upper threshold flow, then the method 500 proceeds to 530 to determine if the SOC is less than the upper threshold, as described above with respect to 524. Under these conditions, the exhaust flow is capable of driving both the turbines of the engine and the battery does not demand immediate charging. A valve device located in an exhaust gas transverse line may be opened in order to directly flow exhaust gas from the engine to the second turbine. Thus, substantially equal portions of exhaust gas may be directed to the first and second turbines in order to drive the first and second compressors to a desired compressor speed based on the desired volume of charge air.

If the SOC is not less than the upper threshold, then the battery is fully charged and the method 500 proceeds to 532 to deactivate the first and second converters.

If the SOC is less than the upper threshold, then the method 500 proceeds to 534 to operate at least one of the first and second converters in the generator mode. In one example, both the first and second converters may be operated in the generator mode. In this way, the wastegate of the first turbine is at least partially open and both the first and second converters recharge the battery.

At 536, the method 500 continues to monitor the battery SOC in order to determine if a charging condition is still desired. The method 500 may also monitor the exhaust flow in order to determine if the exhaust flow falls below the upper threshold flow (e.g., a motor condition of at least one of the converters is requested).

The exemplary method 500 is illustrative by nature and other exemplary methods may be used to operate in the first and second electrical converters. Furthermore, the routine shown in the method 500 may be operated in an alternate order. The method 500 illustrates a routine for operating the first and second electrical converters based on exhaust flow and a SOC of the battery.

In this way, first and second electrical converters may be used with a vehicle comprising twin turbochargers. The first and second electrical converters may be powered by a battery to electrically assist respective second and first comrpessors in response to an insufficient exhaust flow. Alternatively, at least one of the first and second electrical converters may recharge the battery in response to a recharge request of the battery and an exhaust flow being able to drive at least one of the turbines of the vehicle. The technical effect of utilizing first and second electrical converters may be to simultaneously charge a battery of the vehicle and electrically assist at least one compressor of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a turbocharged engine with a first turbocharger comprising at least a first turbine and a first compressor on a first shaft, and a second turbocharger comprising at least a second turbine and a second compressor, where the first and second turbochargers are arranged in a parallel and sequential relationship;
an exhaust line comprising a valve device located between the engine and the second turbine; and
a first electrical energy converter located on a second shaft between the second turbine and the second compressor, wherein the first turbine is continuously driven and the second turbine is driven only when the valve device is at least partially open.

2. The system of claim 1, wherein the first turbocharger further comprises a second electrical energy converter located on the first shaft between the first turbine and the first compressor.

3. The system of claim 2, wherein the first and second electrical energy converters are electrically coupled to a battery.

4. The system of claim 3, wherein the first and second electrical energy converters are powered by the battery in order to electrically assist the respective second and first compressors of the engine.

5. The system of claim 3, wherein the first and second electrical energy converters convert a kinetic motion of the first and second turbines to electrical energy in order to recharge the battery.

6. The system of claim 1, wherein the first turbine further comprises a wastegate and a wastegate passage fluidly coupled to the second turbine.

7. The system of claim 6, wherein the first electrical energy converter is in a generator mode when the wastegate is at least partially open.

8. A method of controlling a boosted engine, comprising:
determining engine operating conditions;
operating at least a first electrical energy converter coupled to a second turbocharger shaft in a generator mode while operating a second electrical energy converter coupled to a first turbocharger shaft in a motor mode, responsive to an exhaust flow amount and a battery state of charge.

9. The method of claim 8, further comprising operating both the first and second electrical energy converters in the motor mode and providing electrical assistance to respective second and first compressors in response to the exhaust flow amount being less than a lower threshold flow.

10. The method of claim 9, further comprising operating both the first and second electrical energy converters in the generator mode in response to an immediate charging request and the exhaust flow amount being greater than an upper threshold flow.

11. The method of claim 8, wherein the second turbocharger shaft further comprises a turbine and where opening a valve device located in a passage between an engine and the turbine flows a portion of exhaust gas to the turbine.

12. The method of claim 11, wherein the first electrical energy converter is in the generator mode and the second electrical energy converter is in the motor mode in response to the exhaust flow amount being greater than a lower threshold flow and less than an upper threshold flow.

13. The method of claim 12, wherein operating the first electrical energy converter in the generator mode further includes actuating a wastegate of another turbine to at least a partially open position.

14. The method of claim 8, wherein exhaust gas is conducted into turbines of the first and second turbocharger shafts, while the second and the first electrical energy converters are operated as generators, respectively.

15. A system, comprising:
a twin turbocharged engine;
a first turbocharger parallel and sequential to a second turbocharger, where the first turbocharger comprises a first turbine and a first compressor on a first shaft, and where the second turbocharger comprises a second turbine and a second compressor on a second shaft;
an exhaust gas transverse line located between the engine and the second turbine, wherein exhaust gas flows directly to the second turbine via the exhaust gas transverse line when a valve device is in an open position;
a first electrical energy converter located on the second shaft between the second turbine and the second compressor;
a second electrical energy converter located on the first shaft between the first turbine and the first compressor;
a battery electrically coupled to the first electrical energy converter and the second electrical energy converter; and
a controller with computer-readable instructions for:
changing a mode of operation of the first electrical energy converter or the second electrical energy converter based on one or more of an exhaust flow and a battery state of charge.

16. The system of claim 15, wherein the first turbine further comprises a wastegate with a wastegate passage leading to the second turbine.

17. The system of claim 15, wherein the first turbocharger continuously receives exhaust gas during engine operation.

18. The system of claim 15, wherein the first electrical energy converter electrically assists the second compressor and the second electrical energy converter electrically assists the first compressor.

* * * * *